United States Patent
Scheid (10) Patent No.: US 11,036,883 B2
(45) Date of Patent: Jun. 15, 2021

(54) DATA FILTERING FOR DATA REQUEST WORKFLOW SYSTEM

(71) Applicant: UNITED TECHNOLOGIES CORPORATION, Farmington, CT (US)

(72) Inventor: Paul Raymond Scheid, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 962 days.

(21) Appl. No.: 15/412,086

(22) Filed: Jan. 23, 2017

(65) Prior Publication Data

US 2018/0211061 A1 Jul. 26, 2018

(51) Int. Cl.
| | |
|---|---|
| *G06F 16/00* | (2019.01) |
| *G06F 21/62* | (2013.01) |
| *B64D 43/00* | (2006.01) |
| *G07C 5/00* | (2006.01) |
| *G06F 16/25* | (2019.01) |
| *G06Q 10/00* | (2012.01) |
| *B64D 45/00* | (2006.01) |

(52) U.S. Cl.
CPC ......... *G06F 21/6254* (2013.01); *B64D 43/00* (2013.01); *G06F 16/258* (2019.01); *G06Q 10/00* (2013.01); *G07C 5/00* (2013.01); *B64D 2045/0085* (2013.01)

(58) Field of Classification Search
CPC ... G06F 16/258; G06F 21/6254; G06Q 10/00; G07C 5/00; B64D 43/00; B64D 2045/0085

USPC .......................................................... 707/694
See application file for complete search history.

(56) References Cited

U.S. PATENT DOCUMENTS

| | | | |
|---|---|---|---|
| 4,470,116 | A | 9/1984 | Ratchford |
| 5,408,412 | A | 4/1995 | Hogg et al. |
| 5,968,115 | A * | 10/1999 | Trout ..................... G06F 9/4843 |
| | | | 718/107 |
| 6,466,858 | B1 | 10/2002 | Adibhatla et al. |
| 7,455,495 | B2 | 11/2008 | Leogrande et al. |
| 7,769,507 | B2 | 8/2010 | Volponi et al. |
| 7,869,908 | B2 | 1/2011 | Walker |
| 8,116,936 | B2 | 2/2012 | Hershey et al. |
| 8,306,791 | B2 | 11/2012 | Yerramalla et al. |
| 8,712,729 | B2 | 4/2014 | Liu et al. |
| 9,043,263 | B2 | 5/2015 | McCarthy et al. |

(Continued)

OTHER PUBLICATIONS

Aguilera Alvaro et al: "Advancing a Gateway Infrastructure for Wind Turbine Data Analysis", Journal of Grid Computing, Springer Netherlands, Dordrecht, vol. 14, No. 4, Sep. 21, 2016 (Sep. 21, 2016), pp. 499-514.

(Continued)

*Primary Examiner* — Thanh-Ha Dang
(74) *Attorney, Agent, or Firm* — Carlson, Gaskey & Olds, P.C.

(57) ABSTRACT

A data request workflow system comprises a vehicle operational data. A file processing system receives the vehicle operational data. At least one set of predefined file editing rules automatically applies the at least one set of predefined file editing rules to automatically edit vehicle operational data such that the vehicle operational data cannot be linked to a specific vehicle operator.

22 Claims, 3 Drawing Sheets

(56) References Cited

U.S. PATENT DOCUMENTS

| | | | |
|---|---|---|---|
| 9,218,233 B2 | 12/2015 | Venditti et al. | |
| 9,824,591 B1* | 11/2017 | Ryan | G01C 21/20 |
| 9,884,585 B1* | 2/2018 | Lubbers | B60Q 9/008 |
| 2004/0181670 A1* | 9/2004 | Thune | G06F 21/6263 |
| | | | 713/176 |
| 2004/0260777 A1* | 12/2004 | Kolb | G07C 5/008 |
| | | | 709/206 |
| 2006/0217885 A1* | 9/2006 | Crady | G01C 21/00 |
| | | | 701/469 |
| 2006/0235739 A1* | 10/2006 | Levis | G06Q 10/08 |
| | | | 705/1.1 |
| 2007/0011105 A1* | 1/2007 | Benson | G07G 1/0036 |
| | | | 706/1 |
| 2007/0263632 A1 | 11/2007 | Sobue et al. | |
| 2008/0021927 A1 | 1/2008 | Coulter | |
| 2008/0211652 A1* | 9/2008 | Cope | B60K 35/00 |
| | | | 340/461 |
| 2008/0215408 A1* | 9/2008 | Pachon | G06Q 10/063116 |
| | | | 705/7.16 |
| 2009/0048730 A1 | 2/2009 | Akkaram et al. | |
| 2009/0150022 A1* | 6/2009 | McMillin | G06Q 10/20 |
| | | | 701/33.4 |
| 2010/0257838 A1 | 10/2010 | Mazarro et al. | |
| 2012/0053778 A1* | 3/2012 | Colvin | G06F 11/079 |
| | | | 701/29.4 |
| 2012/0265562 A1* | 10/2012 | Daouk | G06Q 10/10 |
| | | | 705/5 |
| 2013/0114879 A1 | 5/2013 | Scheid et al. | |
| 2014/0031958 A1* | 1/2014 | Loganathan | G05B 19/4184 |
| | | | 700/79 |
| 2014/0032169 A1 | 1/2014 | McCarthy et al. | |
| 2014/0047551 A1 | 2/2014 | Nagasundaram et al. | |
| 2014/0052481 A1* | 2/2014 | Monteil | G06Q 10/02 |
| | | | 705/5 |
| 2014/0200932 A1* | 7/2014 | Daouk | G06Q 10/02 |
| | | | 705/5 |
| 2014/0279707 A1* | 9/2014 | Joshua | G06Q 30/0283 |
| | | | 705/400 |
| 2015/0142216 A1* | 5/2015 | Tillman | B64D 31/06 |
| | | | 701/3 |
| 2015/0323933 A1* | 11/2015 | Darbois | G05D 1/0005 |
| | | | 701/4 |
| 2015/0339241 A1* | 11/2015 | Warner | G06F 13/385 |
| | | | 710/74 |
| 2015/0369138 A1 | 12/2015 | Phillips et al. | |
| 2016/0177856 A1 | 6/2016 | Martinez et al. | |
| 2016/0314631 A1 | 10/2016 | Sobanski | |
| 2017/0061812 A1* | 3/2017 | Lahav | G09B 9/042 |
| 2017/0068828 A1 | 3/2017 | Nishi et al. | |
| 2017/0262790 A1* | 9/2017 | Khasis | G08G 1/012 |
| 2018/0003516 A1* | 1/2018 | Khasis | G08G 1/20 |

OTHER PUBLICATIONS

Extended European Search Report for European Application No. 18152764.9 dated Apr. 17, 2018.

* cited by examiner

DATA FILTERING FOR DATA REQUEST WORKFLOW SYSTEM

BACKGROUND OF THE INVENTION

Vehicle manufacturers and suppliers of various vehicle sub-systems use vehicle operational data to perform many different functions to support vehicle operators. For example, health monitoring of the vehicle or vehicle sub-systems, e.g. propulsion, environmental, etc., can provide important information that can be used to improve overall vehicle operation. Often, continuous data is collected from the vehicle and the associated sub-systems while the vehicle is operating. This operational data is either collected into a file or streamed back to a ground server to process the data for eventual use for vehicle health monitoring. This vehicle data is a huge compilation of thousands of individual data parameters, most of which are not relevant to an individual system supplier that may require operational data for their specific sub-system.

Further, the operational data can be sensitive to a vehicle operator or vehicle driver or pilot in the case of an aircraft vehicle. For example, at any given time a vehicle driver may control the vehicle in a manner that is best for the current operational safety of the vehicle but which may not be best for the specific performance or maintenance cost of a vehicle sub-system. As such, when a vehicle data request is submitted to the vehicle data owner/operator by a supplier for a vehicle sub-system, the data owner must manually review the data request to determine what data can be sent. This request also requires internal approvals from the vehicle data owner/operator and possibly the drivers' union. Thus, the data owner will have to review all of the data, analyze the data request, and remove sensitive data and data that is not relevant to the supplier request. This process is very time consuming and creates significant delays for suppliers to receiving and analyzing data.

SUMMARY OF THE INVENTION

In a featured embodiment, a data request workflow system comprises a vehicle operational data. A file processing system receives the vehicle operational data. At least one set of predefined file editing rules automatically applies the at least one set of predefined file editing rules to automatically edit vehicle operational data such that the vehicle operational data cannot be linked to a specific vehicle operator.

In another embodiment according to the previous embodiment, a data acquisition system mounted within a vehicle collects the vehicle operational data in a raw format.

In another embodiment according to any of the previous embodiments, the vehicle operational data in the raw format includes at least a date of operation. The file processing system, upon receipt of vehicle operational data in raw format, automatically edits all date of operation information that is linked to the vehicle operational data per the file editing rules.

In another embodiment according to any of the previous embodiments, the file processing system edits all date of operation information by changing a date of operation to a predefined set date or by removing all dates of operation from the vehicle operational data.

In another embodiment according to any of the previous embodiments, the vehicle operational data in the raw format includes one or more of the following: time of operation, location at departure, location at arrival, and/or a vehicle identification number.

In another embodiment according to any of the previous embodiments, the file processing system, upon receipt of vehicle operational data in raw format, automatically edits all data that is related to at least one of the time of operation, location at departure, location at arrival, and the vehicle identification number per the file editing rules.

In another embodiment according to any of the previous embodiments, the data acquisition system comprises an avionics computer system that is mounted within an aircraft.

In another embodiment according to any of the previous embodiments, airline personnel define the predefined editing rules.

In another embodiment according to any of the previous embodiments, the file processing system, upon receipt of flight data from the avionics computer system, automatically edits the flight data per the predefined editing rules such that flight data cannot be linked to specific flights.

In another embodiment according to any of the previous embodiments, a file delivery request comprises a data request for a subset of the vehicle operational data. The file processing system, per the file editing rules, automatically filters out vehicle operational data that is not relevant to the data request to provide a converted data file to be transmitted to a user that submitted the file delivery request.

In another embodiment according to any of the previous embodiments, the file processing system includes a control module with at least one processor, a memory portion to store the predefined file editing rules, one or more input device interfaces to receive the vehicle operational data and the file delivery request, and one or more output devices interfaces to communicate the converted data filed to the user.

In another featured embodiment, a method for processing a data request in a workflow system comprises providing vehicle operational data, obtaining predefined file editing rules for the vehicle operational data, and providing a file processing system that receives the vehicle operational data and the predefined file editing rules. The file processing system automatically applies the at least one set of predefined file editing rules to automatically edit vehicle operational data such that the vehicle operational data cannot be linked to a specific vehicle operator.

In another embodiment according to the previous embodiment, a data acquisition system mounted within a vehicle collects the vehicle operational data in a raw format.

In another embodiment according to any of the previous embodiments, the vehicle operational data in the raw format includes at least a date of operation. The file processing system, upon receipt of vehicle operational data in raw format, automatically edits all date of operation information that is linked to the vehicle operational data per the file editing rules.

In another embodiment according to any of the previous embodiments, all date of operation information is edited by changing a date of operation to a predefined set date or by removing all dates of operation from the vehicle operational data.

In another embodiment according to any of the previous embodiments, the vehicle operational data in the raw format includes one or more of the following: time of operation, location at departure, location at arrival, and/or a vehicle identification number. The file processing system, upon receipt of vehicle operational data in raw format, automatically edits all data that is related to at least one of the time of operation, location at departure, location at arrival, and the vehicle identification number per the file editing rules.

In another embodiment according to any of the previous embodiments, the data acquisition system comprises an avionics computer system that is mounted within an aircraft, and wherein airline personnel define the predefined editing rules.

In another embodiment according to any of the previous embodiments, the file processing system, upon receipt of flight data from the avionics computer system, automatically edits the flight data per the predefined editing rules such that flight data cannot be linked to specific flights.

In another embodiment according to any of the previous embodiments, a file delivery request is provided that comprises a data request for a subset of the vehicle operational data, and wherein the file processing system, per the file editing rules, automatically filters out vehicle operational data that is not relevant to the data request to provide a converted data file to be transmitted to a user that submitted the file delivery request.

In another embodiment according to any of the previous embodiments, the converted data file is transmitted to a user that submitted the file delivery request in a desired format defined by the user in the file delivery request.

The foregoing features and elements may be combined in any combination without exclusivity, unless expressly indicated otherwise.

These and other features may be best understood from the following drawings and specification.

DETAILED DESCRIPTION

Figure 1:
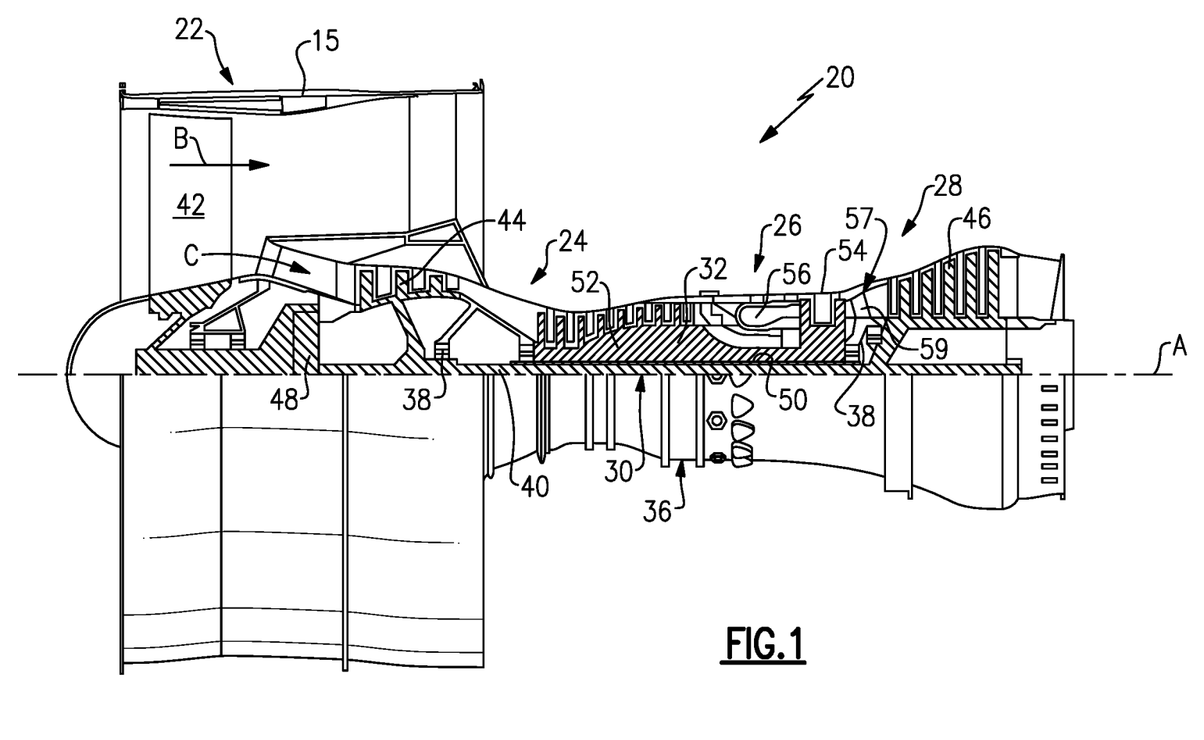
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° R)/(518.7° R)]^{0.5}$. The "Low corrected fan tip speed" as disclosed herein according to one non-limiting embodiment is less than about 1150 ft/second.

Vehicles such as aircraft, cars, trucks, buses, trains, etc., include various vehicle systems and sub-systems like the engine or propulsion system and the lubrication or cooling sub-system that are required for operating the vehicle. Each of these sub-systems is provided by a supplier to a manufacturer of the vehicle. Suppliers and manufacturers for the vehicle are interested in monitoring overall vehicle operation and health, as well as monitoring operation of each vehicle sub-system. The data generated by these monitoring operations provides useful information for improving vehicle and sub-system efficiency, maintenance free operation, diagnostics, troubleshooting, etc.

Often, during operation of the vehicle, situations or conditions arise that may raise new issues with regard to vehicle or sub-systems. When a new issue is raised regarding a vehicle or sub-system, the vehicle manufacturer or supplier will need to be involved to help analyze the issue. The supplier will need specific vehicle operational data to perform their analysis, and this usually requires a new request for unique vehicle operational data that was unanticipated when the original vehicle data collection definition was defined. This requires the supplier to submit a new data request to the vehicle manufacturer or owner/operator for the additional operational data. Traditionally, these requests have been manually processed by the manufacturers or owner/operators as communication of such data requires multiple internal approvals. This is very time consuming and creates significant delays in resolving the issue being investigated.

Figure 2:
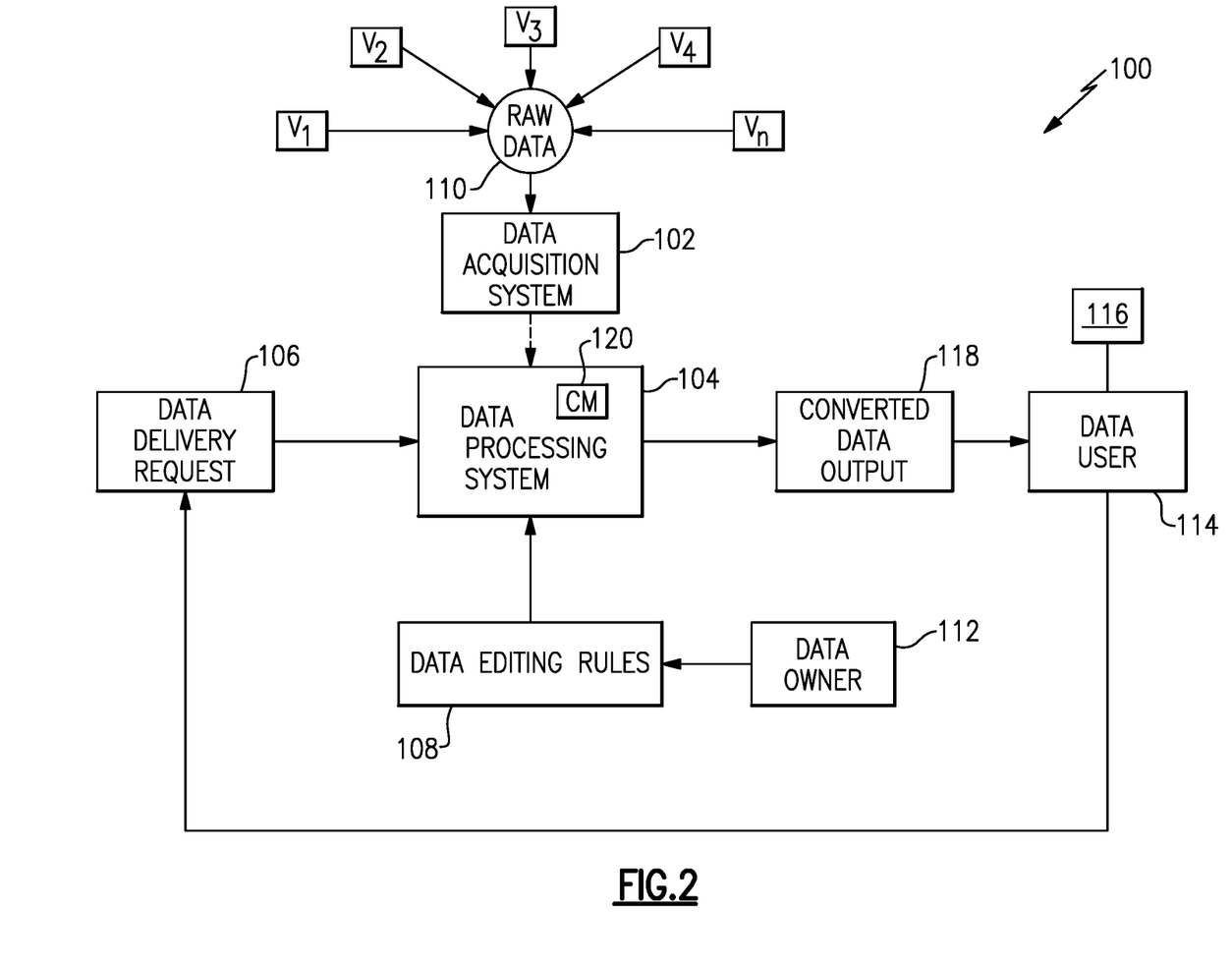
FIG. 2 is a schematic diagram of a data request workflow system according to an embodiment.

FIG. 2 shows an example of a vehicle data request workflow system 100 that automates data requests and streamlines data filtering to provide significant improvements on turnaround time for data requests. In one example, the vehicle data request workflow system 100 includes a data acquisition system 102, a data processing system 104, a data delivery request system 106, and a set of data editing rules 108. The data acquisition system 102 comprises a computer system that collects raw data 110 that is generated by any one of various types of vehicles $V_1$-$V_n$ such as an aircraft $V_1$, car $V_2$, truck or bus $V_3$, train $V_4$, or any other type of vehicle $V_n$. The raw data 110 that is collected is defined by data acquisition definition rules. For example, the owner of the vehicle data may be an airline, a vehicle original equipment manufacturer, a fleet operator, etc. The data acquisition system 102 transmits the collected data to the data processing system 104. When a data user 114, such as a supplier of a vehicle sub-system 116 for example, desires to review/analyze certain data related to the sub-system 116, the data user 114 submits a data delivery request 106 which is communicated to the data processing system 104.

The data delivery request 106 identifies the data user 114 and includes a specific identification of the desired data feed information that is being requested. The data delivery request 106 can also include a request that the output data file be in a specific format such as MATLAB® for example, and can include a request that the data user/requester 114 be notified in a specific manner, such as by secure email, text message, etc. By specifically tailoring the data delivery request 106 upon input to the data processing system 104, a significant amount of time is saved as the data owner 112 does not have to individually select data parameter information related to the sub-system 116 that can be communicated back to the data user 114 based on a sub-system request.

This type of request allows the data owner 112 to provide a set of predefined data editing rules that is stored within the data processing system 104. The predefined data editing rules are used to automatically filter, edit, and convert the various data parameters provided by the data acquisition system 102 into a useable format that can be communicated to the data user 114. As such, in response to the data delivery request 106, the data processing system 104 automatically applies the data owner specified data editing rules for that specific data delivery request applying the specified predefined data editing rules 108 to filter out a predefined sub-set of the vehicle operational data that is either not included in the data request or is not authorized to be included and to automatically edit data that is part of the data request per predefined criteria for each type of vehicle operational data. Once this filtering and editing process is complete, a converted data output 118 is provided in the specified data format, which can then be transmitted/communicated to the data user/requester 114.

The example data processing system 104 includes at least one control module 120. The control module 120 comprises at least one computing device that includes processors, memory, input devices, output devices, etc. This will be discussed in greater detail below. The control module 120 is configured to automatically process the raw data 110 collected by the data acquisition system 102 and convert it into engineering unit data that can be useful for analysis. For example, each type of data may include multiple individual data counts that are compiled together with an appropriate scaling factor applied to the complied data counts to provide a desired data format. In one example, the data acquisition system 102 wirelessly communicates all of the data collected in the vehicle to the data processing system 104 as a data input file or data stream.

Figure 3:
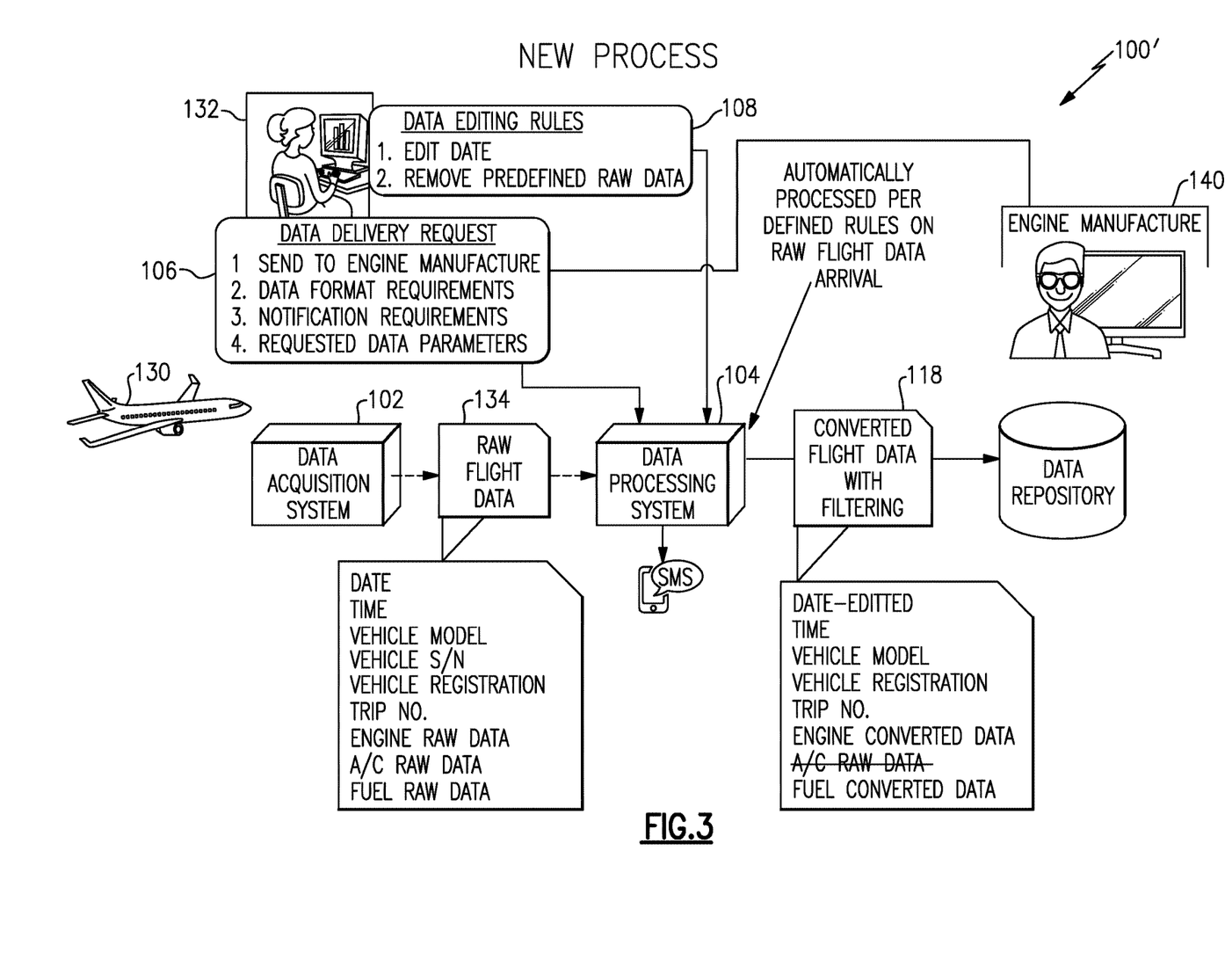
FIG. 3 is a schematic diagram of the data request workflow system of FIG. 2 according to an embodiment.

As discussed above, this data processing system 104 can receive data input files or data streams from any of various different types of vehicles. FIG. 3 shows an example in which the vehicle is an aircraft 130, the data owner is an airline 132, and the data user/requester is an aircraft engine manufacturer 140. In alternate embodiments, the aircraft engine manufacturer 140 may be the data owner. In this example, the data request workflow system 100 includes the data acquisition system 102, data processing system 104, data delivery request system 106, and data editing rules 108 as described above. The data acquisition system 102 comprises an avionics computer system that collects raw data 134 that is generated by the aircraft 130. The collected raw data 134 can include aircraft data and sub-system data such as that for an aircraft engine, landing gear, environmental control system, etc. The raw data 110 that is collected is defined by a data acquisition file that is provided by the data owner. Raw flight data 134 can include, for example: date, time, aircraft model, aircraft serial number, aircraft registration number, trip number, engine raw data, aircraft operational raw data, fuel system raw data, departing airport, arrival airport etc. The data acquisition system 102 generates files or data streams that contain collected aircraft, engine, and fuel data and transmits the files or data streams to the data processing system 104.

When the aircraft engine manufacturer 140 desires to review/analyze certain data related to the engine 20 (FIG. 1), the engine manufacturer 140 submits a data delivery request 106 which is communicated to the data processing system 104. According to an embodiment, the data delivery request 106 identifies the specific requester as the engine manufacturer 140, and includes a specific identification of the desired data parameter information that is being requested. The data delivery request 106 can also include a request that the output data file or data stream be in a specific format such as MATLAB® for example, and identifies the manner in which the engine manufacturer 140 should be notified when the data is available. By specifically tailoring the data delivery request 106 upon input to the data processing system 104, a significant amount of time is saved as the airline 132 does not have to individually select data parameter information related to the engine 20 that can be communicated back to the engine manufacturer 140 based on the engine data request.

The airline 132 provides the predefined data editing rules 108 that are stored within the data processing system 104. The predefined data editing rules 108 are used to automatically filter, edit, and convert the various data files or data streams provided by the data acquisition system 102 into a useable format that can be communicated to the engine manufacturer 140. When the raw flight data files or data streams are received by the data processing system 104, the system automatically processes the files or data streams per the predefined editing rules 108. For example, the predefined editing rules include rules that automatically edit raw flight data such that vehicle operational data cannot be linked to specific flights flown by specific pilots. Thus, in one example, any raw data that includes the date can be converted such that the date would always be the first of the month or some other predefined date. Optionally, any data that includes time of day can also be edited or converted to a predefined common time. Further, any data that includes departing or arrival airports can be removed.

Other predefined editing rules can come into play after the raw flight data has been edited, and once a new data delivery request is submitted. For example, an engine manufacturer 140 may want to analyze engine operation in relation to fuel system operation and would therefore request data parameters that would include information related to the engine and the fuel system. In response to such a data delivery request 106, the data processing system 104 automatically applies the predefined data editing rules 108 to filter out a predefined sub-set of the vehicle operational data that is not included in the data request. Thus, if engine and fuel system data is requested, other raw data which is not related to the engine or fuel system, such as landing gear or environmental control system data for example, would automatically be removed. Further, the data editing rules are used to automatically edit the engine and fuel system data that is part of the data request per predefined criteria for each type of operational data. This would include, for example, converting the raw engine data and raw fuel system data into an engineering unit data format to provide engine converted data and fuel system converted data. Once this filtering and editing process is complete, a converted data 118 is provided in the specified data format, which can then be transmitted/communicated to the engine manufacturer 140.

In one example, once the converted data 118 is ready to be transmitted, notice can be given to the airline 132 such that the data can be reviewed and approved prior to transmission. However, for certain types of data delivery requests which may be routinely requested, the data editing rules can allow transmission of the converted data file or data stream without having airline personnel individually approving each data request output. The predefined data editing rules can also automatically flag any new data feed requests not previously requested by the engine manufacturer 140 and automatically submit any new flagged data feed request to the airline. The data owner can then review the data request and either approve the request or propose modifications or filters to the request as needed. According to an alternate embodiment, the data owner may pre-approve data requests for a given requestor.

As discussed above, the data processing system 104 includes at least one control module 120. There are various types of control modules 120 that can be used to implement the functionality described in this disclosure. In terms of hardware architecture, the example control module 120 is a computing device or multiple computing devices either locally hosted or hosted in the cloud and can include one or more processors, a memory portion, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor or controller may be a hardware device for executing software, particularly software stored in the memory portion. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion, which includes the software and data editing rules, can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion may include one or more additional separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the control module 120 of the data processing system 104 is in operation, the processor can be configured to execute software stored within the memory portion, to communicate data to and from the memory portion, and to generally control operations of the computing device pursuant to the software. Software in memory, in whole or in part, is read by the processor, perhaps buffered within the processor, and then executed.

The subject data processing system 104 also automates the specific request for vehicle operational data from the vehicle operator. The subject system has the data user/customer define their specific request for data based on an existing data feeds that the data user/customer may not have had access to previously or by creating a brand new data feed request. This new request is submitted to the vehicle operator for approval and when approved would either provide operational data from an existing feed or generate the new feed and get data from the new feed. This new capability allows data users/customers to get their critical data more quickly and provide the vehicle operator the ability to have the data user/customer perform the work to define the necessary data feed and all the vehicle operator needs to do is review, adjust only if necessary and approve the new operational data feed.

The subject invention provides a data processing system that automates the editing of the vehicle data file or data stream compiled by the data acquisition system to improve turnaround time for delivery of vehicle data to data users/customers so that critical time-sensitive deadlines and maintenance decisions are not missed. The data processing system is pre-configured with predefined rules to edit vehicle data files or data streams automatically upon receipt of such files or data streams such that a new converted file or data stream is automatically generated that changes or edits out unnecessary or sensitive data. The new converted file or data stream can then be immediately delivered to the specified data user/customer. The data processing system can also have multiple data users/customers that require the same input vehicle data but can customize the output files or data streams for each data user/customer based on the predefined editing rules. This allows the data user/customer to receive their critical data in a timely manner while still providing the data owner with necessary privacy for their sensitive operational data.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A data request workflow system comprising:
  a plurality of vehicle sub-systems that generate vehicle operational data;
  a data processing system that receives the vehicle operational data;
  a data acquisition system mounted within a vehicle to collect the vehicle operational data, and wherein the data acquisition system comprises a computer system that is mounted within a vehicle;
  at least one set of predefined data editing rules, wherein the data processing system automatically applies the at least one set of predefined data editing rules to automatically edit vehicle operational data such that the vehicle operational data cannot be linked to a specific vehicle driver;
  a data delivery request that comprises a data request for a set of the vehicle operational data, and wherein the data processing system, per the at least one set of predefined data editing rules, automatically filters out vehicle operational data that is not relevant to the data request to provide a converted data file or data stream to be transmitted to a data user that submitted the data delivery request; and
  wherein the data processing system includes a control module comprising one or more computing devices either locally hosted or hosted in a cloud, and which includes at least one processor, a memory portion to store the predefined data editing rules, one or more input device interfaces to receive the vehicle operational data and the data delivery request, and one or more output devices interfaces to communicate the converted data file or data stream to the data user.

2. The data request workflow system according to claim 1 wherein the vehicle operational data includes at least a date of operation, and wherein the data processing system, upon receipt of vehicle operational data, automatically edits all date of operation information that is linked to the vehicle operational data per the data editing rules.

3. The data request workflow system according to claim 2, wherein the data processing system edits all date of operation information by changing a date of operation to a predefined set date or by removing all dates of operation from the vehicle operational data.

4. The data request workflow system according to claim 1 wherein the vehicle operational data includes one or more of the following: time of operation, location at departure, location at arrival, and/or a vehicle identification number.

5. The data request workflow system according to claim 4 wherein the data processing system, upon receipt of vehicle operational data, automatically edits all data that is related to at least one of the time of operation, location at departure, location at arrival, and the vehicle identification number per the data editing rules.

6. The data request workflow system according to claim 1 wherein the vehicle comprises an aircraft and the vehicle driver is a pilot, and wherein the computer system comprises an avionics computer system that is mounted within the aircraft.

7. The data request workflow system according to claim 6 wherein airline personnel define the predefined editing rules.

8. The data request workflow system according to claim 7 wherein the data processing system, upon receipt of flight data from the avionics computer system, automatically edits the flight data per the predefined editing rules such that flight data cannot be linked to specific flights.

9. The data request workflow system of claim 1, wherein data collected by the data acquisition system includes at least a date of operation, and wherein the data processing system, upon receipt of the data, automatically executes the first editing rule and edits all date of operation information that is linked to the vehicle operational data per the data editing rules, and wherein the data processing system automatically processes the data collected by the data acquisition system and converts the data into engineering unit data prior to processing the data delivery request.

10. The data request workflow system of claim 1, wherein the predefined data editing rules automatically flag any new data delivery requests not previously requested by the user and automatically submits any new flagged data delivery request to a data owner such that the data owner reviews the flagged data delivery request and approves the flagged data delivery request or proposes modifications or filters to the flagged data delivery request.

11. The data request workflow system of claim 1, wherein the plurality of vehicle sub-systems includes an aircraft engine or propulsion system, a landing gear system, an environmental control system, a lubrication system, and/or a cooling system.

12. A method for processing a data request in a workflow system comprising:
providing vehicle operational data from a plurality of vehicle sub-systems;
obtaining predefined data editing rules for the vehicle operational data;
providing a data processing system that receives the vehicle operational data and the predefined data editing rules;
providing a data acquisition system mounted within a vehicle to collect the vehicle operational data, and wherein the data acquisition system comprises a computer system that is mounted within a vehicle;
wherein the data processing system automatically applies the at least one set of predefined data editing rules to automatically edit vehicle operational data such that the vehicle operational data cannot be linked to a specific vehicle driver;
providing a data delivery request that comprises a data request for a set of the vehicle operational data, and wherein the data processing system, per the data editing rules, automatically filters out unnecessary or unrequested data, and automatically filters out vehicle operational data that is not relevant to the data request to provide a converted data file or data stream to be transmitted to a data user that submitted the data delivery request; and
transmitting the converted data file or data stream to a data user that submitted the data delivery request in a desired format defined by the data user in the data delivery request.

13. The method according to claim 12 wherein the vehicle operational data includes at least a date of operation, and wherein the data processing system, upon receipt of vehicle operational data, automatically edits all date of operation information that is linked to the vehicle operational data per the data editing rules.

14. The method according to claim 13 including editing all date of operation information by changing a date of operation to a predefined set date or by removing all dates of operation from the vehicle operational data.

15. The method according to claim 13 wherein the vehicle operational data includes one or more of the following: time of operation, location at departure, location at arrival, and/or a vehicle identification number; and wherein the data processing system, upon receipt of vehicle operational data, automatically edits all data that is related to at least one of the time of operation, location at departure, location at arrival, and the vehicle identification number per the data editing rules.

16. The method according to claim 12 wherein the vehicle is an aircraft and the vehicle driver is a pilot, and wherein the computer system comprises an avionics computer system that is mounted within the aircraft, and wherein airline personnel define the predefined editing rules.

17. The method according to claim 16 wherein the data processing system, upon receipt of flight data from the avionics computer system, automatically edits the flight data per the predefined editing rules such that flight data cannot be linked to specific flights.

18. The method according to claim 12, including communicating with the data acquisition system mounted within the vehicle that collects the data, and wherein the data includes at least a date of operation, and wherein the data processing system, upon receipt of the data, automatically executes the first editing rule and edits all date of operation information that is linked to the vehicle operational data per the data editing rules, and wherein the data processing system automatically processes the data collected by the data acquisition system and converts the data into engineering unit data prior to processing the data delivery request.

19. The method according to claim 12, wherein the predefined data editing rules automatically flag any new data delivery requests not previously requested by the user and automatically submits any new flagged data delivery request to a data owner such that the data owner reviews the flagged data delivery request and approves the flagged data delivery request or proposes modifications or filters to the flagged data delivery request.

20. The method according to claim 12, wherein the plurality of vehicle sub-systems includes an aircraft engine or propulsion system, a landing gear system, an environmental control system, a lubrication system, and/or a cooling system.

21. A method for processing a data request in a workflow system comprising:
providing vehicle operational data, wherein the vehicle operational data includes data from a plurality of vehicle sub-systems;
obtaining predefined data editing rules for the vehicle operational data;
providing a data processing system that receives the vehicle operational data and the predefined data editing rules;
a data acquisition system mounted within a vehicle to collect the vehicle operational data, and wherein the data acquisition system comprises a computer system; and
wherein the data processing system automatically applies the at least one set of predefined data editing rules to automatically edit vehicle operational data such that the vehicle operational data cannot be linked to a specific vehicle driver; and
wherein the data processing system receives the vehicle operational data from the plurality of vehicle sub-systems, and wherein the data processing system automatically applies a first editing rule from the at least one set of predefined data editing rules to automatically edit the data such that the vehicle operational data cannot be linked to the specific vehicle driver or operator, and/or cannot be linked to a specific route or flight, and including
generating a data delivery request via a user of at least one of the plurality of vehicle sub-systems, and wherein the data delivery request includes identification of the user and specific identification of desired data feed information for a subset of the vehicle operational data corresponding to the at least one of the plurality of vehicle sub-systems, and wherein the at least one set of predefined data editing rules includes editing the vehicle operational data to filter out data from vehicle sub-systems that is not part of the data delivery request subsequent to the first editing rule being applied, and
generating a converted data output once the at least one set of predefined data editing rules have been applied such that the converted data output can be communicated to the user.

22. A data request workflow system comprising:
vehicle operational data, wherein the vehicle operational data includes data from a plurality of vehicle sub-systems;
a data processing system that receives the vehicle operational data;
a data acquisition system mounted within a vehicle to collect the vehicle operational data, and wherein the data acquisition system comprises a computer system;
at least one set of predefined data editing rules, wherein the data processing system automatically applies the at least one set of predefined data editing rules to automatically edit vehicle operational data such that the vehicle operational data cannot be linked to a specific vehicle driver; and
wherein the data processing system receives the vehicle operational data from the plurality of vehicle sub-systems, and wherein the data processing system automatically applies a first editing rule from the at least one set of predefined data editing rules to automatically edit the data such that the vehicle operational data cannot be linked to the specific vehicle driver or operator, and/or cannot be linked to a specific route or flight, and including
a data delivery request generated by a user of at least one of the plurality of vehicle sub-systems, and wherein the data delivery request includes identification of the user and specific identification of desired data feed information for a subset of the vehicle operational data corresponding to the at least one of the plurality of vehicle sub-systems, and wherein the at least one set of predefined data editing rules includes editing the vehicle operational data to filter out data from vehicle sub-systems that is not part of the data delivery request subsequent to the first editing rule being applied, and
a converted data output that is generated once the at least one set of predefined data editing rules have been applied, and which is to be communicated to the user.

* * * * *